United States Patent [19]

Galland et al.

[11] Patent Number: 4,963,646

[45] Date of Patent: Oct. 16, 1990

[54] PREPARATION OF AMORPHOUS POLYAMIDES BASED ON AROMATIC DICARBOXYLIC ACIDS AND ON ALIPHATIC DIAMINES FROM UNBALANCED POLYAMIDE PREPOLYMER

[75] Inventors: Genevieve Galland, Lyons; Jean Coquard, Grezieu la Varenne, both of France

[73] Assignee: Rhone-Poulenc Chimie, Courbevoie, France

[21] Appl. No.: 420,927

[22] Filed: Oct. 13, 1989

[30] Foreign Application Priority Data

Oct. 13, 1988 [FR] France ................. 88 14299

[51] Int. Cl.$^5$ ............................................ C08G 69/28
[52] U.S. Cl. ..................................... 528/347; 525/432; 528/335; 528/336; 528/339; 528/349
[58] Field of Search ............... 528/347, 339, 336, 335, 528/349; 525/432

[56] References Cited

U.S. PATENT DOCUMENTS 4,245,066  1/1981  Nakagawa et al. ................. 528/347

FOREIGN PATENT DOCUMENTS 0084661  8/1983  European Pat. Off. .

Primary Examiner—Harold D. Anderson
Attorney, Agent, or Firm—Burns, Doane, Swecker & Mathis

[57] ABSTRACT

Amorphous (co)polyamides are polycondensed from aromatic dicarboxylic acid(s), e.g., isophthalic acid and/or terephthalic acid, and from aliphatic diamine(s), e.g., hexamethylenediamine, by preparing two unbalanced prepolymers of low viscosity, one containing excess COOH endgroups and the other containing excess $NH_2$ endgroups, and then, in a second stage, the two unbalanced prepolymers are mixed in given proportions and their postcondensation is carried out in the molten state in a vented extruder including one or more screws; the amorphous (co)polyamides thus prepared are perfectly transparent and can be easily injection molded into useful shaped articles endowed with good properties, especially in respect of multiaxial impact.

8 Claims, No Drawings

PREPARATION OF AMORPHOUS POLYAMIDES BASED ON AROMATIC DICARBOXYLIC ACIDS AND ON ALIPHATIC DIAMINES FROM UNBALANCED POLYAMIDE PREPOLYMER

BACKGROUND OF THE INVENTION

1. Field of the Invention:

The present invention relates to a novel process for the preparation of amorphous (co)polyamides from at least one aromatic dicarboxylic acid containing from 8 to 18 carbon atoms and from at least one linear or branched chain aliphatic diamine containing from 6 to 12 carbon atoms.

2. Description of the Prior Art:

Wholly aliphatic linear polyamides of the nylon type are known to this art, of high molecular weight, and having many physical and chemical properties which make them suitable for the production of a wide variety of useful shaped articles such as fibers, films and other molded objects. Polyhexamethylene adipamide or nylon 66 is an example of a polyamide which has been extensively developed.

However, these polymers exhibit a certain number of drawbacks, the magnitude of which is a function of their intended use, such as, for example, a mold shrinkage which can be significant, a water regain which may be considerable and, as a corollary, a dimensional stability towards moisture which may be insufficient, and mechanical properties which are adversely affected by environmental moisture which decrease, furthermore, at temperatures above 100° C.

Very many patents describe polyamides containing different groups such as, especially, polyamides containing mixed aliphatic and aromatic recurring units. The introduction of aromatic rings provided an increase in the melting or softening point and in the glass transition temperature, with a consequently improved retention of mechanical properties, especially at high temperatures. Typical polyamides of this type are, for example, the amorphous copolymers produced from isophthalic acid (60% to 90 mol % in the mixture of diacids), terephthalic acid and hexamethylenediamine (cf. U.S. Pat. No. 3,382,216).

To prepare such amorphous (co)polymers, the prior art proposes, for example, to adopt the solution polycondensation technique, according to which the halide(s) of the dicarboxylic acid(s), such as, for example, the chloride(s) of diacid(s) is(are) reacted with the diamine(s), the operation being carried out in a solvent devoid of any traces of water. For a greater efficiency of the polycondensation, it is also necessary to dissolve in the reaction medium an organic base capable of reacting with the hydracid released during the acylation reaction. Once the polycondensation is complete, the polymer is isolated, generally by precipitation in a nonsolvent. This type of process is not of great industrial interest, especially because of the fairly high cost of the starting dihalides of aromatic carboxylic acids and of the complexity of the apparatus, which must permit the handling of large volumes of liquids in relation to the amount of polymer produced.

Another known method of preparation of (co)polyamides based on aromatic dicarboxylic acid(s) and on aliphatic diamine(s) entails the classical nylon 66 type of bulk polycondensation process in a melt. Stoichiometric amounts of diamine(s) and of dicarboxylic acid(s) are introduced, water being added if appropriate, into a stainless steel autoclave. It is sometimes advantageous to prepare the salt of the diamine(s) and dicarboxylic acid(s) beforehand. The reactants are heated to a temperature ranging from about 200°0 to 200° C., under stirring. The water present is removed and the temperature is increased to approximately 250° to 280° C. At this temperature, stirring of the reaction mixture is continued for some time at atmospheric pressure and ultimately at a reduced pressure, in a stream of nitrogen, until the time when the polymer has attained the desired molecular weight and viscosity. In order to obtain, upon completion of this stage, (co)polyamides which, after molding, provide shaped articles having good mechanical properties, it is generally necessary to continue the polycondensation until the time when the (co)polymer has attained viscosity characteristics, expressed in the form of the viscosity index (VI), measured in meta-cresol at 25° C. on a solution containing 0.5 g of dried polymer in 100 cm$^3$ of solvent, which are at least equal to 100 ml/g. However, in this viscosity range, the following problem is encountered: the (co)polyamide flows with difficulty in the molten state and, as a result, is difficult to drain properly from the autoclave in which it is prepared. More precisely, the draining pressure is high, the draining time is long and the proportion o degree of draining is low.

SUMMARY OF THE INVENTION

Accordingly, a major object of the present invention is the provision of a novel process for the preparation in bulk melt (or liquid phase) of (co)polyamides based on at least one aromatic dicarboxylic acid containing from 8 to 18 carbon atoms and on at least one linear or branched chain aliphatic diamine containing from 6 to 12 carbon atoms, having a sufficient VI value, equal to at least 100 ml/g and preferably ranging from 130 ml/g to 150 ml/g, and which novel process conspicuously avoids those disadvantages and drawbacks of draining to date characterizing the state of this art.

Another object of the present invention is the provision of a novel process for the preparation of amorphous (co)polyamides which have an excellent transparency. The degree of transparency is observed especially in polymer granules obtained by chopping a small-diameter rod obtained from the molten polymer after rapid cooling, for example by immersion in water at 20° C. A transparent polymer lends itself well to the manufacture, for example, of packaging films, of technical storage vessels, of safety glazing and of light signals.

Yet another object of the present invention is the provision of a novel process employing an apparatus, the operation of which can be easily adjusted to prepare (co)polyamides in the form of polycondensates corresponding to the equilibrium state of the amidification reactions which have developed.

Briefly, the present invention features a novel process for the preparation of amorphous (co)polyamides, noncontinuously and in bulk melt, according to which at least one aromatic dicarboxylic acid containing from 8 to 18 carbon atoms is polycondensed with at least one linear or branched aliphatic diamine containing from 6 to 12 carbon atoms, such novel process comprising sequentially carrying out the following two stages:

(i) a first stage: entailing separately preparing, in a manner known per se according to a classical nylon 66 type polycondensation process, from compositions either containing the diacid(s) and the diamine(s) and optionally a catalyst, or comprising their salt(s) and optionally a catalyst, the operation being carried out in a closed system of the autoclave type, optionally in the presence of water, two unbalanced prepolymers, each having a VI ranging from 70 to 96 ml/g:

(a) one containing excess COOH endgroups, namely, prepared from amounts of constituents of the starting composition such that the difference:

$$d1 = EG\ COOH - EG\ NH_2$$

where EG COOH represents the content of COOH endgroups and EG $NH_2$ represents the content of $NH_2$ end groups, ranges from 170 to 260 meq/kg, the determination of the number of endgroups being carried out as more fully described below, and (b) the other containing excess NH2 endgroups, namely, prepared from amounts of constituents of the starting composition such that the difference:

$$d2 = EG\ NH_2 - EG\ COOH.$$

also ranges from 170 to 260 meq/kg; and (ii) a second stage comprising directly mixing the two unbalanced prepolymers in the solid state, in any manner permitting good homogenization, in weight proportions such that the difference:

$$\Delta EG = \Sigma G\ COOH\ (prepolymers) - \Sigma G\ NH_2\ (prepolymers)$$

as an absolute value, ranges from 100 meq/kg to 160 meq/kg, and then completing the polycondensation by conducting a postcondensation in the molten state of the two unbalanced prepolymers, the operation being carried out with heating in a vented extruder containing one or more screws; wherein the essential operating conditions of such vented extruder include a temperature of the reaction zone ranging from 255° C. to 295° C., a devolatilization pressure of this zone ranging from $2 \cdot 10^2$ Pa to $1,000 \cdot 10^2$ Pa and a residence time of the mixture in the vented extruder ranging from 30 seconds to 2 minutes, such that at the outlet of the vented extruder (co)polyamides are recovered which are in the form of polycondensates corresponding to the equilibrium state of the amidification reactions and having a VI ranging from 100 ml/g to 150 ml/g and, preferably, from 130 ml/g to 150 ml/g.

DETAILED DESCRIPTION OF THE PREFERRED EMBODIMENTS OF THE INVENTION

More particularly according to the present invention, the difference DEG in the amounts of COOH and $NH_2$ endgroups is that which is established for the combination of the two unbalanced prepolymers, and is calculated, in a manner known per se, from the amounts of endgroups and from the respective proportions of each of the two unbalanced prepolymers used to form the mixture.

Also, by the expression "reaction zone" is intended the zone of the vented extruder which is heated, included between the feed zone and the final die, where the two mixed unbalanced prepolymers are in the molten state, are subjected to shearing forces of variable degrees and are subjected to from 60 to 90 mol %, and the value of the difference $d1 = EG\ COOH - EG\ NH_2$ being adjusted to the desired value by adding a calculated excess of isophthalic and terephthalic acids (the amount of isophthalic acid in the mixture of the diacids added by way of excess also ranging from 60% to 90 mol % in this case) in the compound C1, C2 or C3; more precisely, this excess, expressed as the molar percentage of the excess diacids according to the relationship:

$$\frac{\text{total number of moles of diacids} - \text{number of moles of diacids of the compound C1, C2 or C3}}{\text{number of moles of diacids of compound C1, C2 or C3}} \times 100$$

ranges from 2.1% to 3.4%.

With regard to the practical manner of preparing the prepolymer containing excess COOH endgroups, it should be noted that this generally entails carrying out the following operations:

(i) the starting mixture is progressively adjusted by heating to an autogenous steam pressure ranging from a value just above atmospheric pressure to 3 MPa. The desired autogenous steam pressure is attained by a progressive heating for, for example, a time period ranging from 10 minutes to 2 hours up to a temperature ranging from 180° C. to 220° C.;

(ii) then, the pressure being maintained at the autogenous pressure, the water present in the reaction mixture is removed by steady distillation over a period of time ranging, for example, from 30 minutes to 1 hour 30 minutes, such as to adjust the temperature of the mass at the end of distillation to a value ranging from 230° C. to 250° C.; the desired postcondensation reaction requiring the removal, by suitable venting, of the water of condensation formed.

The starting compositions, (cf. first stage) containing either isophthalic acid and/or terephthalic acid and hexamethylenediamine, plus an optional catalyst, or their salt(s) plus an optional catalyst, are well suited for the process according to the present invention. Advantageously, the starting material compositions contain either isophthalic acid, terephthalic acid and hexamethylenediamine, plus an optional catalyst, or their salt(s) plus an optional catalyst, in which the amount of isophthalic acid in the mixture of the two acids ranges from 60% to 90 mol %.

The procedure for preparing the two unbalanced prepolymers used in the process of the invention will now be described.

The prepolymer containing excess COOH endgroups can be prepared by reacting, optionally in the presence of water, the compounds:

(C1) either of a mixture: isophthalic acid + terephthalic acid + hexamethylenediamine + optionally, a catalyst, contributing equivalent numbers of COOH and $NH_2$ groups;

(C2) or of the stoichiometric salt: (isophthalic + terephthalic) acids/hexamethylenediamine, either alone or optionally mixed with a catalyst;

(C3) or of the mixture: stoichiometric isophthalic acid/hexamethylenediamine salt + stoichiometric terephthalic acid/hexamethylenediamine salt + optionally, a catalyst; in which the amount of isophthalic acid in the mixture of the diacids used to produce the compounds C1, C2 or C3 ranges (iii) the pressure is then progressively decreased, over a time period ranging, for example, from 40 minutes to 2 hours, from the autogenous pressure value to the atmospheric pressure value and at the same time the temperature of the reaction mass is increased to a value ranging from 260° C. to 280° C.; and (iv) lastly, the prepolymerization is terminated by permitting the reaction mixture to react at the temperature ranging from 260° C. to 280° C. for a sufficient period, on the order, for example, of 10 minutes to 50 minutes, whereby a prepolymer of desired viscosity is obtained.

The prepolymer containing excess $NH_2$ endgroups can be prepared in a manner which is similar to that described for the prepolymer containing excess COOH endgroups. It should be noted that, in this case, the value of the difference $d2 = EG\ NH_2 - EG\ COOH$ is adjusted to the desired value by addition of a calculated excess of hexamethylenediamine (the "excess 1") in the compound C1, C2 or C3; this excess 1, expressed as the molar percentage of excess diamine, according to the relationship:

$$\frac{\text{total number of moles of diamine} - \text{number of moles of diamine of the compound C1, C2 or C3}}{\text{number of moles of diamine of compound C1, C2 or C3}} \times 100$$

must range from 2.1% to 3.4%.

In the case of the prepolymer containing excess COOH endgroups, as in that of the prepolymer containing excess $NH_2$ endgroups, it may be advantageous to introduce an amount of diamine(s) (hexamethylenediamine in the present example) which is greater than that needed (that is to say, within the scope of the operating procedure indicated: the amount for equivalence between the COOH and $NH_2$ groups in the compound C1, C2 or C3 + excess 1 in the case of the prepolymer containing excess $NH_2$ endgroups) such as to introduce into the reaction mixture an excess of diamine(s) (the "excess 2") thus compensating for the loss of this reactant which can take place during the distillation operation and/or during the autoclave decompression operation; according to the operating procedure indicated, this excess 2, expressed as the molar percentage of excess hexamethylenediamine according to the relationship:

$$\frac{\text{total number of moles of diamine} - \text{number of moles of diamine needed}}{\text{total number of moles of diamine needed}} \times 100$$

ranges, for example, from 0.1 to 3%.

As utilized herein, the pressure referred to is always the absolute pressure.

"Water present in the reaction mixture" is intended to define the water which is formed during the polycondensation of the diacid(s) with the diamine(s), plus optionally the water introduced at the outset with the constituents of the reaction mixture. The amount of water optionally introduced at the outset is not critical and may vary over wide limits.

For conducting the first stage of the process according to the invention, the diamine(s) may be introduced in the solid state, in the molten state or in the form of an aqueous solution. The salt(s) of diacid(s) and of diamine(s) can also be introduced in the solid state, in the molten state or in the form of an aqueous solution.

In a preferred embodiment of the first stage of the process according to the invention, each unbalanced prepolymer is prepared by introducing the reactants in the form of stoichiometric salt(s) derived from diacid(s) and from diamine(s) [stoichiometric (isophthalic + terephthalic) acids/hexamethylenediamine salt in the case of the above-exemplified operating procedure] and using a catalyst (compound C2 in the case of the exemplified operating procedure). To effect, on the one hand, the stoichiometry in the manufacture of the salt(s) of diacid(s) and of diamine(s) and, on the other hand, the desired excess of the stoichiometry by adding acid(s) (to attain the desired value d1) or of diamine(s) (to attain the desired value d2), it is possible to carry out accurate weighing of reactants whose quality is exactly known at the time of use. It is preferable to monitor the stoichiometry by measuring the pH of sample solutions obtained by diluting the salt(s) in a suitable solvent.

With regard to the catalyst which may be employed, this generally is either a compound ($\alpha$) or of a compound ($\beta$), with ($\alpha$) representing an inorganic oxygen-containing mono- or polyacid or an organic oxygen-containing mono- or polyacid other than a carboxylic acid, in which at least one of the acidic functional groups has an ionization constant pka in water at 25° C. equal to or lower than 4, and ($\beta$) representing an alkali or alkaline earth metal salt of this acid.

Exemplary strong acids which are thus suitable include, for example:

(i) as the inorganic oxyacids, sulfurous, sulfuric, hypophosphorous, phosphorous, orthophosphoric or pyrophosphoric acids;

(ii) as the organic oxyacids:

organosulfonic acids of the formula $R_1—SO_3H$ (I) in which $R_1$ is a linear or branched chain alkyl radical containing from 1 to 6 carbon atoms, a phenyl radical optionally substituted by 1 to 3 alkyl radicals containing from 1 to 3 carbon atoms, a phenylalkyl radical containing from 1 to 3 carbon atoms in the alkyl moiety and whose benzene nucleus may optionally be substituted by 1 to 3 alkyl radicals containing from 1 to 3 carbon atoms, or a naphthyl radical optionally substituted by 1 to 4 alkyl radicals containing from 1 to 3 carbon atoms;

organophosphonic acids of the formula $R_2—P(O)(OH)_2$ (II) in which $R_2$ is an alkyl radical, a phenyl radical or a phenylalkyl radical, each of these radicals having the definition given above for $R_1$;

organophosphonic acids of the formula $R_3R_4—P(O)(OH)$ (III) in which each of $R_3$ and $R_4$, which may be identical or different, is a linear alkyl radical containing from 1 to 3 carbon atoms, a phenyl radical or a phenylalkyl radical, each of these latter two radicals having the definition given above for $R_1$;

organophosphonous acids of the formula $R_5H—P(O)(OH)$ (IV) in which $R_5$ is a linear or branched chain alkyl radical containing from 1 to 4 carbon atoms (branching being excluded in the case of an alkyl radical containing 4 carbon atoms), a phenyl radical or a phenylalkyl radical, each of these latter two radicals having the definition given above for $R_1$.

It is preferred to employ as a strong acid ($\alpha$) the acids derived from phosphorous and more particularly hypophosphorous, phosphorous, orthophosphoric, pyrophosphoric, methylphosphonic, phenylphosphinic, benzylphosphonic, dimethylphosphinic, diphenylphosphinic, methylphenylphosphinic, dibenzylphosphinic, methylphosphonous, phenylphosphonous or benzylphosphonous acids.

With regard to the salt of acid ($\beta$), of salts of alkali metals or of alkaline earth metals derived from inorganic or organic oxyacids ($\alpha$) are typically used.

It is preferred to employ as a salt ($\beta$) those which are completely soluble in the reaction mixture. Among these preferred salts ($\beta$), those suitable are sodium and potassium salts derived from the particular types of inorganic or organic oxyacids (α) which are suitable and which are indicated above. The salts (β) which are very particularly suitable are the sodium and potassium salts derived from the preferred acids derived from phosphorus and noted above.

The proportions of strong acid (α) or of salt (β), expressed as a weight percentage relative to the final prepolymer, generally range from 0.01% to 1% and preferably from 0.01% to 0.5%.

The process according to the present invention comprises a second stage, entailing mixing the two unbalanced prepolymers in given proportions, and then performing the postcondensation in the molten state in a vented extruder.

With regard to operation of this second stage, the following points should be appreciated:

Although it is possible to start with a mixture of the two unbalanced prepolymers, in the case of which the difference ΔEG, discussed above, is, as a relative value, either a positive number (the mixture contains a majority of reactive COOH groups), or a negative number (the mixture then contains a majority of reactive NH₂ groups), it will be preferred to start with a mixture in the case of which the difference ΔEG is a positive number, the risks of branching due to secondary reactions being minimized in this case.

The difference ΔEG and the essential operating conditions of the vented extruder including, as indicated above, the reaction zone temperature, the devolatilization pressure in this zone and the residence time in the extruder, are parameters which are not independent. It must be understood that a good behavior of the second stage of the process according to the invention may be obtained for a given difference ΔEG by adjusting, for example, the value of the reaction zone temperature in its relevant range and by selecting the values of the other two parameters within their relevant ranges as is known to this art, notably as regards the change in the devolatilization (steam) pressure as a function of a desired VI value for the polymer and the influence of reaction times on amidification.

More specifically, in the case of the above-mentioned illustrative procedure entailing use of isophthalic acid (60% to 90 mol % in the mixture of diacids), terephthalic acid and hexamethylenediamine, a good conduct of the second stage of the process according to the invention, with a view to attaining VI values situated, for example, in the preferred range of 130 to 150 ml/g, may be obtained:

(i) by adjusting the value of the reaction zone temperature in its relevant range of 255° C. to 295° C.;

(ii) by selecting the value of the devolatilization pressure according to the indications of the table which follows:

| DEG (meg/k) | Pressure (10² Pa) |
|---|---|
| 100 | from 500 to 900 |
| 120 | from 200 to 700 |
| 140 | from 5 to 400 |
| 160 | from 5 to 250; | and (iii) and by fixing a residence time, in the range of from 30 seconds to 2 minutes, at a value which makes it possible to obtain at the outlet of the extruder a polycondensate corresponding to the equilibrium state of the amidification reactions.

With regard to the vented extruder itself, the type of equipment which can be employed is not critical, so long as it is suitable for permitting the blending of plastics in the molten state and is equipped with a device enabling volatile or gaseous materials to be evacuated. Exemplary of equipment which can thus be employed, representative are: single-screw vented extruders such as especially the extruders available in the art under the trademarks: Brabender, Prodex, Reifenhauser, Samafor, Thoret; twin-screw vented extruders such as especially the extruders available in the art under the trademarks: Buss, ZSK, Leistritz. A twin-screw vented extruder will be preferably employed.

It is apparent that, in the process according to the invention, the composition of the starting reactants may also include various additives which are commonly employed in the preparation of conventional polyamides. These additives are, in particular, chain-limiters such as, principally, monocarboxylic acids such as, for example, acetic acid, nucleating agents, and stabilizers of various kinds.

The process according to the invention permits the preparation, without encountering technical difficulties, of transparent amorphous (co)polyamides which can be suitably converted according to the usual injection-molding techniques to produce shaped objects endowed with good mechanical properties. With regard to the conversion conditions, the (co)polyamides obtained by the process according to the invention, beginning with, for example, isophthalic acid (60% to 90 mol % in the mixture of diacids), terephthalic acid and hexamethylenediamine, may be easily injection molded using a material temperature ranging from 260° C. to 330° C., where there is no risk of degradation and at an average injection pressure of the material on the order, for example, of 5 MPa to 9 MPa. With regard to mechanical properties, this term is intended to define especially the resilience values such as the strength tested using instrumented multiaxial impact (such as measured in the conditions defined hereinafter), which may be well above 80 J in the case, for example, of the above-mentioned copolyamides of isophthalic acid, terephthalic acid and hexamethylenediamine.

In order to further illustrate the present invention and the advantages thereof, the following specific examples are given, it being understood that same are intended only as illustrative and in nowise limitative.

In said examples to follow, a certain number of determinations were carried out. Similarly, various operations were measured. The operating methods and/or the standards according to which these checks and measurements of properties were carried out are indicated below:

DETERMINATION OF THE CONTENT OF ENDGROUPS IN A PREPOLYMER:

This determination was carried out by potentiometric titration of the solution of the prepolymer in a 70/30 by weight trifluoroethanol/chloroform mixture with an 0.02 N solution of trifluoromethanesulfonic acid in nitrobenzene. In the case of a prepolymer containing excess COOH endgroups, this titration with trifluoromethanesulfonic acid was followed by a back-titration of the same test sample with an 0.1 N solution of tetrabutylammonium hydroxide in toluene. The use of the potentiometric curve exhibiting two potential steps permitted the contents of COOH and NH₂ endgroups to be determined. The results are given in milligram equivalents (meq) per kilogram of prepolymer (meq/kg).

VISCOSITY INDEX:

This index was determined at 25° C. according to the international standard ISO 307, 1977 edition, on a solution containing 0.5 g of polymer (dried for 2 hours at 60° C. under an argon stream) in 100 cm$^3$ of meta-cresol.

EXAMINATION OF TRANSPARENCY:

The degree of transparency was observed with the unaided eye, on the one hand, on polymer granules obtained by chopping the rod collected at the exit of the extruder and cooled by rapid immersion in a water bath at 20° C. and, on the other hand, on injection-molded bar-type test specimen 60×60×2 mm in size, prepared as described below:

MULTIAXIAL IMPACT STRENGTH:

This determination was carried out at 23° C. on the above-mentioned bar-type test specimens, conditioned at RHO (=0% relative humidity), according to the specifications of the NF standard T 51118 under the following conditions:

Striker mass: 20 kg,
Drop height: 1 m,
Impact velocity: 4.1 m/s,
Available energy: 168 J,
Hemispherical striker with a diameter of: 20 mm.

The result is given in the form of total energy absorbed in the impact, expressed in joules (J).

With regard to the test specimens enabling transparency to be evaluated and the multiaxial impact strength to be measured, these were prepared by molding with the aid of a Vis-Piston machine of Battenfeld trademark, type BSKM 100/70 DS 2000, the operating conditions of which will be specified in the examples given below.

EXAMPLE 1

This Example describes the preparation of an amorphous and transparent copolyamide from isophthalic acid (70 mol % in the mixture of diacids), terephthalic acid (30 mol % in the mixture of diacids) and hexamethylenediamine, having a viscosity index (VI) equal to 140 ml/g.

First stage of preparation of the unbalanced prepolymers:

(1) Prepolymer No. 1, containing excess COOH endgroups:

Preparation of the stoichiometric (isophthalic+terephthalic) acids/hexamethylenediamine salt in aqueous solution:

The operation was carried out in a 500-l stainless steel reactor fitted:

(i) with a coil heating system charged with steam whose pressure was maintained constant between 4×10$^5$ Pa and 5×10$^5$ Pa;

(ii) with a turbine-type stirrer (speed 1500 revolutions/minute);

(iii) with a system permitting pressurizing with nitrogen;

(iv) with a circuit permitting the volatile products to be condensed and collected.

The following materials were introduced cold into the reactor, which was maintained under a gentle nitrogen purge:

291.077 kg of an aqueous solution containing 32.4% by weight of hexamethylenediamine (813.008 moles of hexamethylenediamine);

83.447 kg of distilled water;

94.472 kg of isophthalic acid (569.106 moles);

40.488 kg of terephthalic acid (243.902 moles).

The temperature of the mass was increased to 60° C. and the mixture was stirred for 2 hours while the nitrogen purge was continued. The pH of the salt was then adjusted to 7.60+0.05 by successive additions of small amounts of hexamethylenediamine or of a 70/30 mole isophthalic acid/terephthalic acid mixture (pH measured at 20° C. on an aqueous solution at a concentration of 10% by weight of salt). A perfectly stoichiometric aqueous solution containing 45% by weight of salt was thus obtained.

After 3 nitrogen purges by pressurizing to 3×10$^5$ Pa followed by decompression, the concentration of the aqueous solution from 45% by weight to 70% by weight was effected over 45 minutes by evaporation at atmospheric pressure of a part of the water present in the mixture.

Polycondensation in an autoclave:

The apparatus employed was a 500-l stainless steel autoclave, stirred and equipped for operation up to 300° C. and 26×10$^5$ Pa of pressure. It was fitted:

(i) with a heating system via a jacket and heat-transfer fluid;

(ii) with an anchor-type stirrer (speed 16 revolutions/minute);

(iii) with a system permitting pressurization with nitrogen;

(iv) with a circuit enabling the volatile products to be condensed and collected.

The following materials were introduced into the preheated autoclave:

327.6 kg of the stoichiometric aqueous solution of salt at a concentration of 70% by weight, which was prepared above;

2.834 kg of isophthalic acid (17.073 moles) and 1.215 kg of terephthalic acid (7.317 moles) in suspension in 10 liters of distilled water (molar percentage of excess diacids=2.9%);

2.329 kg of an aqueous solution containing 32.4% by weight of hexamethylenediamine (molar percentage of excess hexamethylenediamine=0.8%) to compensate for the losses which occur during the distillation and decompression operations;

200 g of an aqueous solution of hypophosphorus acid at a concentration of 50% by weight;

100 cm3 of silicone antifoam.

After 3 purges with nitrogen by pressurizing to 3×10$^5$ Pa followed by decompression, the temperature of the mass was increased to 215° C. over 10 minutes while maintaining autogenous pressure. A pressure of 1.9 MPa was attained. The water present in the reaction mixture was distilled off at a constant pressure of 1.9 MPa over 1 hour, 10 minutes, such as to attain a mass temperature of 250° C. The pressure was brought down to atmospheric pressure over 1 hour, 30 minutes, and at the same time the temperature of the mass was increased to 260° C. The prepolymer, which began to be stirred as soon as the mass temperature exceeded 230° C., was maintained stirred at 260° C. at atmospheric pressure for approximately 30 minutes to attain the amidification equilibrium. The prepolymer was then drained from the autoclave under nitrogen pressure and granulated after cooling with water.

The characteristics measured on this prepolymer, designated prepolymer No. 1, were the following:

| EG COOH (meq/kg) | EG NH$_2$ (meq/kg) | $d_1$ (meq/kg) | VI (ml/g) |
|---|---|---|---|
| 262.5 | 21.4 | 241.1 | 74.7 |

(2) Prepolymer No. 2 containing excess NH$_2$ endgroups:

The operating procedure was identical to that described for preparing prepolymer No. 1 containing excess COOH endgroups. The only difference was in the amount of the charges which were introduced into the autoclave and which were the following:

327.6 kg of the aqueous solution of stoichiometric salt at a concentration of 70% by weight;

6.520 kg of an aqueous solution containing 32.4% by weight of hexamethylenediamine (molar percentage of excess hexamethylenediamine=2.19%, designated excess 1) to adjust the difference $d_2$=EG NH$_2$−EG COOH of the prepolymer;

6.113 kg of an aqueous solution containing 32.4% by weight of hexamethylenediamine (molar percentage of excess hexamethylenediamine=2.01%' designated excess 2) to compensate for the losses which occur during the distillation and decompression stages;

200 g of an aqueous solution of hypophosphorus acid at a concentration of 50% by weight;

100 cm$^3$ of silicone antifoaming agent.

The characteristics measured on the prepolymer obtained, designated prepolymer No. 2, are summarized below:

| EG COOH (meq/kg) | EG NH$_2$ (meq/kg) | $d_2$ (meq/kg) | VI (ml/g) |
|---|---|---|---|
| 18.575 | 191.5 | 172.925 | 95.0 |

Second stage of postcondensation in a vented extruder:

The two prepolymers No. 1 and No. 2 were mixed in the solid state in proportions of 79.6% by weight and 20.4% by weight respectively, the operation being carried out in a Moritz type mixer, and the mixture was then ground. When these proportions were employed, the difference $\Delta$EG=EG COOH (prepolymers)−EG NH$_2$ (prepolymers) was adjusted to 157 meq/kg.

The above mixture was fed to the hopper of a Leistritz trademark vented extruder with twin screws rotating in parallel, containing screws of diameter D equal to 34 mm and with a length of 35 D, and comprising: a feed zone (including the hopper), a heated reaction zone (including a vented well) and a die. The principal operating conditions of the vented extruder were the following:

Reaction zone temperature: 260-270° C.,
Die temperature: 260° C.,
Devolatilization pressure: 130×10$^2$ Pa,
Speed of rotation of the screws: 150 revolutions/minute,
Material throughput: 6 kg/h,
Residence time: 1 minute.

The polymer collected in rod form at the outlet of the extruder was cooled rapidly in a water bath at 20° C., and was then chopped into granules which were packaged in a sealed bag to prevent any regain of moisture before the injection molding. The polymer granules were perfectly transparent. The viscosity index of the polymer thus obtained was 140 ml/g.

The test specimens injection-molded from the polymer obtained were in a perfectly transparent state. The multiaxial impact strength was reflected in a value of the total energy consumed of 110 J (average of several measurements).

With regard to the molding of test specimens, this was carried out on the Battenfeld machine under the following conditions: material temperature: 330° C., mold temperature: 80° C., material injection pressure: 7.8 MPa and dwell pressure: 5 MPa.

By way of a comparative test (Test A), Example 1 was repeated with the same reactants and catalyst, but the prepolymers No. 1 and No. 2 were mixed in the second stage in such proportions that the difference DEG=REG COOH (prepolymers)−REG NH$_2$ (prepolymers) was equal to 80 meq/kg.

More precisely, the two prepolymers No. 1 and No. 2 were mixed in the solid state in proportions of 61.1% by weight and 38.9% by weight respectively.

The operating conditions of the extruder were identical with those of Example 1, except in respect of the throughput which was, in this case, equal to 5 kg/h (residence time: 70 seconds) and the devolatilization pressure, which was adjusted to 200·10$^2$ Pa. At the outlet of the extruder, the polymer was cooled in water at 20° C., granulated and then packaged in a sealed bag to prevent any moisture regain before injection molding. The viscosity index of the polymer obtained under these conditions had the value of 247 ml/g. The polymer granules were not completely transparent.

With the polymer obtained from this comparative test, the injection molding of the test specimens required a material temperature well above 330° C. and a material injection pressure higher than 9 MPa. In addition, the injection-molded test specimens were not at all transparent.

EXAMPLE 2

This example describes the preparation of an amorphous and transparent copolyamide from isophthalic acid (70 mol % in the mixture of diacids), terephthalic acid (30 mol % in the mixture of diacids) and hexamethylenediamine, which has a VI of 105 ml/g.

First stage of preparation of the unbalanced prepolymers:

The operation was carried out exactly as described above in Example 1.

Second stage of post-condensation in a vented extruder:

Here too, the operation was carried out exactly as described in Example 1, except with regard to the devolatilization pressure, which was adjusted to 400·10$^2$ Pa instead of 130·10$^2$ Pa.

The VI of the polymer obtained under these conditions was equal to 105 ml/g. The polymer granules were perfectly transparent.

The injection-molded test specimens (material temperature: 290° C., mold temperature: 80° C., material injection pressure: 6 MPa, dwell pressure: 3 MPa) were in a perfectly transparent state. The multiaxial impact strength produced a total absorbed energy value of 88 J.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of an amorphous (co)polyamide by polycondensing at least one aromatic dicarboxylic acid having from 8 to 18 carbon atoms with at least one linear or branched chain aliphatic diamine, noncontinuously and in bulk melt, comprising (a) preparing two unbalanced prepolymers from such diacid and diamine, or salts thereof, each having a viscosity index ranging from 70 to 96 ml/g, one having an excess of COOH endgroups such that the difference:

$$d1 = EG\ COOH - EG\ NH_2$$

wherein EG COOH is the amount of COOH endgroups and EG $NH_2$ is the amount of $NH_2$ endgroups, ranges from 170 to 260 meq/kg, and the other having an excess of $NH_2$ endgroups such that the difference:

$$d2 = EG\ NH_2 - EG\ COOH$$

also ranges from 170 to 260 meq/kg, next (b) directly homogeneously admixing said two unbalanced prepolymers in weight proportions such that the difference:

$$\Delta EG = \Sigma G\ COOH(prepolymer) - \sigma G\ NH_2\ (prepolymer)$$

ranges from 100 meq/kg to 160 meq/kg, and then (c) postcondensing such two unbalanced prepolymers, in the molten state, in a vented extruder and at an elevated temperature, thereby providing a (co)polyamide polycondensate in an equilibrium state of amidification and having a viscosity index ranging from 100 ml/g to 150 ml/g.

2. The process as defined by claim 1, said vented extruder defining a reaction zone, the temperature of which ranging from 255° C. to 295° C., the devolatilization pressure of which ranging from $2 \cdot 10^2$ Pa to $1,000 \cdot 10^2$ Pa and the residence time of the mixture therein ranging from 30 seconds to 2 minutes.

3. The process as defined by claim 2, comprising preparing each unbalanced prepolymer from a stoichiometric salt of said diacid and said diamine, in the presence of a catalyst.

4. The process as defined by claim 3, said catalyst comprising either a compound ($\alpha$) or of a compound ($\beta$), with ($\alpha$) being an inorganic oxygen-containing mono- or polyacid or an organic oxygen-containing mono- or polyacid other than a carboxylic acid, in which at least one of the acidic functional groups has an ionization constant pka in water at 25° C. equal to or lower than 4, and ($\beta$) being an alkali or alkaline earth metal salt of such acid.

5. The process as defined by claim 4, wherein the proportions of strong acid ($\alpha$) or of salt ($\beta$), expressed as a weight percentage relative to the final prepolymer, range from 0.01% to 1%.

6. The process as defined by claim 1, wherein $\Delta EG$ is a positive number.

7. The process as defined by claim 1, said diacid reactant comprising isophthalic acid and/or terephthalic acid and said diamine reactant comprising hexamethylenediamine.

8. The process as defined by claim 7, said diacid reactant comprising isophthalic acid + terephthalic acid, with the amount of isophthalic acid in such mixture ranging from 60% to 90 mol %, and said diamine reactant comprising hexamethylenediamine.

* * * * *